(12) United States Patent
Battaglia et al.

(10) Patent No.: US 6,311,856 B2
(45) Date of Patent: *Nov. 6, 2001

(54) DISPLAY STAND MODULE

(75) Inventors: Joseph M. Battaglia, Douglasville; Rafael T. Bustos, Atlanta, both of GA (US)

(73) Assignee: L&P Property Management Company, South Gate, CA (US)

( * ) Notice: Subject to any disclaimer, the term of this patent is extended or adjusted under 35 U.S.C. 154(b) by 1 days.

This patent is subject to a terminal disclaimer.

(21) Appl. No.: 09/779,094

(22) Filed: Feb. 8, 2001

Related U.S. Application Data

(63) Continuation of application No. 09/448,370, filed on Nov. 23, 1999, now Pat. No. 6,220,464, which is a continuation-in-part of application No. 09/240,969, filed on Jan. 29, 1999, now Pat. No. 6,023,034, which is a continuation-in-part of application No. 29/091,303, filed on Jul. 27, 1998, now Pat. No. Des. 420,836, which is a continuation-in-part of application No. 29/091,292, filed on Jul. 27, 1998, now Pat. No. Des. 420,836.

(51) Int. Cl.$^7$ ................................ A47F 5/13; A47B 47/00
(52) U.S. Cl. .................... 211/187; 211/133.1; 211/181.1; 108/147.12; 108/147.15; 108/107
(58) Field of Search .............................. 211/133.1, 133.2, 211/126.9, 186, 187, 181.1; 108/144.11, 147.11, 147.12, 147.15, 147.17, 106, 107

(56) References Cited

U.S. PATENT DOCUMENTS

| | | |
|---|---|---|
| Re. 28,293 | 1/1975 | Bustos . |
| D. 238,543 | 1/1976 | Lechner . |
| D. 282,325 | 1/1986 | Meier . |
| D. 292,764 | 11/1987 | Kester . |
| D. 321,101 | 10/1991 | Zucker . |
| D. 334,854 | 4/1993 | Pestone . |
| D. 373,035 | 8/1996 | Keller et al. . |
| 1,140,940 | 5/1915 | Bales . |
| 1,778,982 | 10/1930 | Pannier . |
| 1,952,111 | 3/1934 | Bales . |
| 3,181,650 | 5/1965 | Cutter et al. . |
| 3,398,981 | 8/1968 | Vincens . |
| 3,498,239 | 3/1970 | Bartlett et al. . |
| 3,608,504 | 9/1971 | Peters . |
| 3,788,242 | 1/1974 | Hassel et al. . |
| 3,835,354 | 9/1974 | Torres-Pena . |
| 4,140,414 | 2/1979 | Buttgereit . |
| 4,433,788 | 2/1984 | Erlam et al. . |
| 4,542,702 | 9/1985 | Johansson . |
| 4,750,626 | 6/1988 | Nicely . |
| 4,934,858 | 6/1990 | Beaulieu . |
| 5,016,765 | 5/1991 | Leonardo . |
| 5,042,671 | 8/1991 | Bischoff et al. . |
| 5,207,527 | 5/1993 | Duncan et al. . |
| 5,609,402 | 3/1997 | Kemp . |
| 5,727,699 | 3/1998 | Gilcrease . |
| 5,797,503 | 8/1998 | Stevens et al. . |
| 5,957,309 | 9/1999 | Hall . |
| 5,957,310 | 9/1999 | Mitchell . |
| 6,036,034 | 3/2000 | Bustos et al. . |

Primary Examiner—Daniel P. Stodola
Assistant Examiner—Erica B. Harris
(74) Attorney, Agent, or Firm—Wood, Herron & Evans, LLP

(57) ABSTRACT

A display stand assembly comprising a plurality of display stand modules joined together. Each display stand module comprises an upper and lower base or spanner having a plurality of spanner members generally bisecting each other medially. A plurality of vertical uprights extends between the end portions of the spanner members of the upper and lower spanners and are joined to the ends of the upper and lower spanners with a plurality of wedges. A portion of each wedge fits around a clover defined on the vertical uprights and a bracket attached to each spanner member end slides over and attaches to each wedge.

8 Claims, 5 Drawing Sheets

DISPLAY STAND MODULE

CROSS-REFERENCE TO RELATED APPLICATIONS

The present application is a continuation application of co-pending U.S. patent application Ser. No. 09/448,370, filed on Nov. 23, 1999, now U.S. Pat. No. 6,220,464, which is a continuation-in-part application of U.S. patent application Ser. No. 09/240,969, filed on Jan. 29, 1999, now U.S. Pat. No. 6,036,034 which is a continuation-in-part application of U.S. Design patent application Ser. No. 29,091,303 filed Jul. 27, 1998, now U.S. Design Pat. No. 420,537 and U.S. Design patent application Ser. No. 29/091,292 filed on Jul. 27, 1998, now U.S. Design Pat. No. 420,836, each disclosure of which is hereby incorporated herein by reference in its entirety.

FIELD OF THE INVENTION

This invention relates to display stands for merchandising products; and more particularly, to a display stand assembly made by joining together a plurality of display stand modules.

BACKGROUND OF THE INVENTION

Display stands are typically used to store and display product in both refrigerated and non-refrigerated environments. Such display stands usually comprise a base, a plurality of vertical support members or posts extending upwardly from the base, and a top supported by the posts. A plurality of shelves are commonly supported by the vertical posts in any number of ways. Such display stands or shelving units are usually rectangular, and the shelves adapted to be used with the display stands are rectangular as well.

U.S. Pat. Nos. 5,016,765 and 3,788,242 disclose such display stands. In each of the display stands disclosed in these patents, a generally rectangular base has four members extending upwardly from the base, which members are used to support vertically oriented posts. Generally rectangular shelves may be supported by the posts at the desired heights. Similarly, the tops of each of the display stands disclosed in these patents have four members which are turned downwardly and inserted into the posts at the top of the display stand.

Each of the display stands disclosed in these patents is self-standing and is not adapted to be joined with other display stands in order to create a larger display stand. If more product is to be displayed, a second display stand must be purchased and placed adjacent to the first display stand. The display stands lack structure which would enable multiple display stands to be joined together to create a larger display stand or assembly.

In addition, such display stands are of a fixed width, length and height which cannot be modified or changed. Thus, if a merchant desires to display additional product above or beside the display stand, an additional display stand must be purchased and placed on top of or beside the existing display stand. Thus, the merchant has to pay for two or more display stands. Furthermore, if an additional display stand is placed on top of an existing display stand, the upper display stand may be unstable and may fall off the lower display stand.

Thus, a display stand which is modular in nature so that different modules may be secured to one another to create the desired structure is needed. With such a structure, modules may be placed on top of one another or connected to each other lengthwise or widthwise in order to create the desired display stand assembly.

Therefore it has been one objective of the present invention to provide a display stand module which may be quickly and easily joined to other display stand modules in order to create an attractive and useful display stand assembly.

It has further been an objective of the present invention to provide a display stand module which may be assembled from a limited number of similar components, reducing the cost of manufacturing.

It has been a further objective of the present invention to provide a display stand module which may be joined with other display stand modules in order to create a display stand assembly specifically configured for a unique environment.

Still another objective of the invention has been to create a multiple module display stand which utilizes components of one module as a common component of an adjacent module so that the total number of components in a multiple module display stand is minimized with a corresponding cost reduction.

SUMMARY OF THE INVENTION

The invention of this application which accomplishes these objectives comprises a display stand assembly having of a plurality of display stand modules joined to one another. Each display stand module comprises a lower base or spanner having a pair of spanner members generally bisecting each other medially, e.g., X-shaped, an upper base or spanner having a pair of spanner members generally bisecting each other medially, e.g., X-shaped, vertical posts or uprights extending between spanner end portions of the upper and lower spanners, a bracket attached to each spanner end portion connecting the vertical post to the spanner, and a stabilizing wedge member sandwiched between each bracket and each vertical upright.

Each vertical upright of the present invention extends from and between respective end portions of spanner members of the upper and lower spanners. Each of the vertical uprights is slotted along its length so that shelves may be supported from the vertical uprights at desired heights by support means locked into engagement with the slots. One type of support means used in accordance with the present invention is a sheet metal clip which is inserted into a slot of a vertical upright and secured into an adjacent slot to position the clip at a predetermined vertical height. The clip is secured around a single segment or clover which partially defines adjacent slots in the vertical upright. The shelves are lowered downwardly into engagement with plural clips secured at a desired height on opposing vertical uprights so that the shelf rests on the clips. The shelves may be vertically adjusted as necessary by moving each clip to a desired height.

In use, a plurality of display stand modules are joined together to form a display stand assembly, each successive display stand module attached to a preceding display stand module by the same method that the first display stand module was erected. That is, a second display stand module may be joined to a first display stand module by connecting second upper and lower spanners to uprights common to the first display stand module. Because each upright has a plurality of clovers, each upright may receive and hold multiple spanner ends of multiple upper or lower spanners.

Therefore, the present invention allows the creation of numerous different configurations of display stand assemblies with the use of a relatively few number of interchangeable parts. According to the practice of the invention, relatively few parts are needed to assemble a display stand module and join a plurality of display stand modules together to create a display stand assembly. Therefore the number of molds or fixtures necessary to make parts is reduced and if parts are lost or stolen, additional parts can be easily obtained. Additionally, no hardware such as screws, nuts or bolts is needed to assemble a display stand module or the display stand assembly according to the practice of the invention. These and other objects and advantages of the present invention will be apparent from the following description of the drawings.

DETAILED DESCRIPTION OF THE PREFERRED EMBODIMENTS

Figure 1:
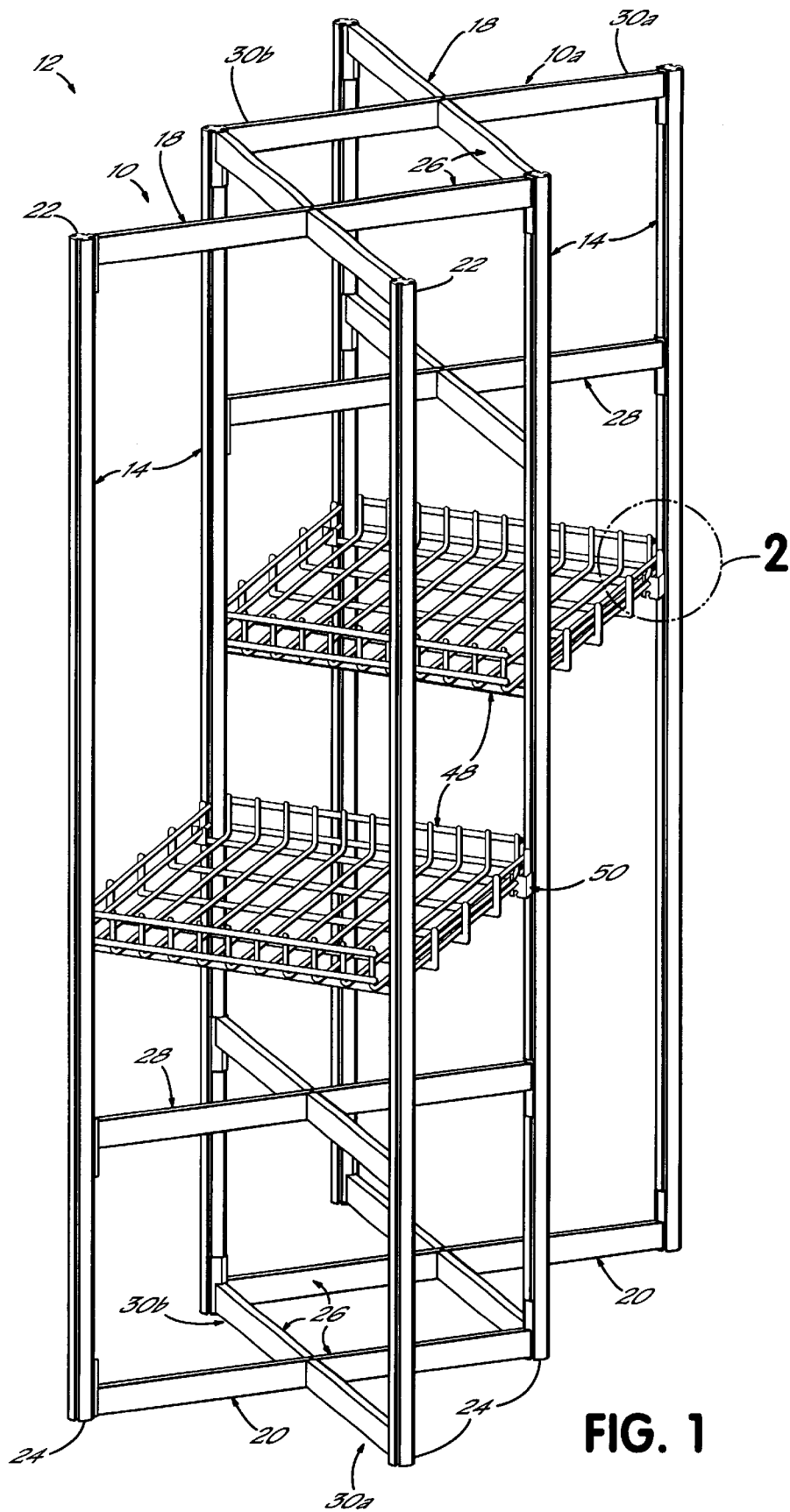
FIG. 1 is a perspective view of a display stand assembly made up of two display stand modules of the present invention.
Figure 2:
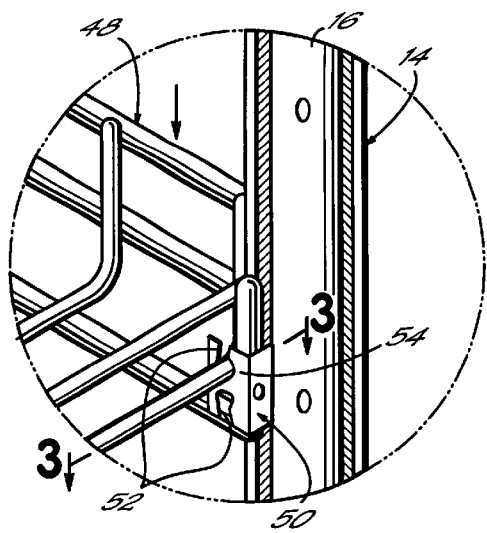
FIG. 2 is an exploded perspective view of the circled portion of the display stand assembly shown in FIG. 1.
Figure 8:
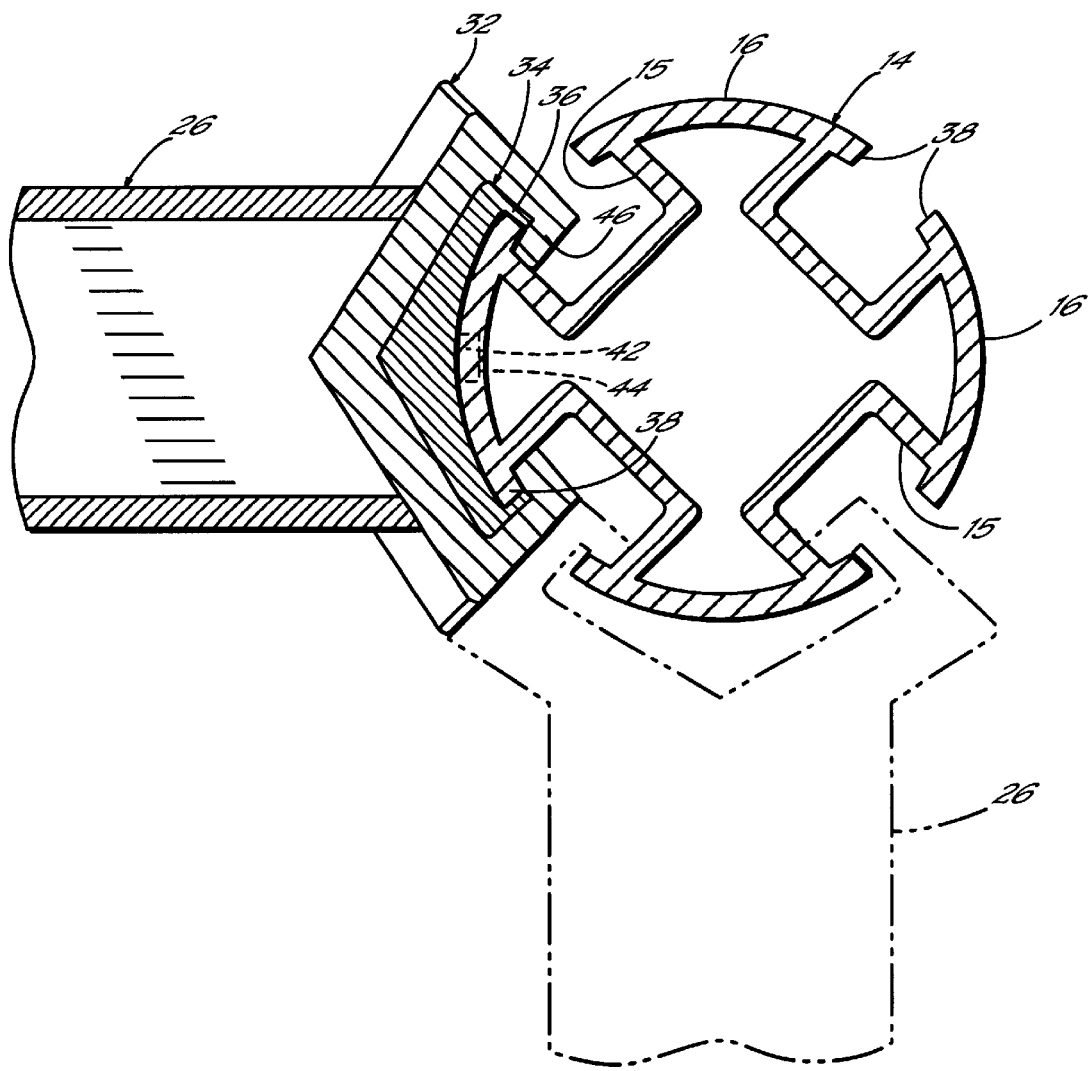
FIG. 8 is a cross-sectional view taken along the line 8—8 of FIG. 10.

As can be seen generally in FIG. 1, a display stand module 10 of the present invention is adapted to be joined to other display stand modules 10a to form a display stand assembly 12. Each display stand module 10, 10a has plurality of extruded columns or vertical uprights 14 defining a plurality of slots 15, adjacent slots 15 partially forming clovers 16, as seen in cross-section (FIG. 8). In a presently preferred embodiment, the vertical uprights 14 are hollow to save in materials cost and to lighten the assembly 12. In another preferred embodiment, the vertical uprights 14 may also be solid. In a presently preferred embodiment the vertical uprights 14 are made of aluminum or plastic. However, any other suitable material may be used to form the vertical uprights 14.

In a presently preferred embodiment, a single module 10 is comprised of four vertical uprights 14, the vertical uprights 14 being secured together by an upper X-shaped spanner 18 and a lower X-shaped spanner 20. The upper and lower X-shaped spanners 18, 20 are preferably made of aluminum, however, any other suitable material may be used. The upper and lower X-shaped spanners 18, 20 are attached to opposed ends 22, 24 of the vertical uprights 14. The upper and lower X-shaped spanners 18, 20 are secured to the vertical uprights 14 so that the X-shaped spanners 18, 20 are substantially parallel to each other to stabilize and strengthen the module 10 when in use and bearing the weight of a load (not shown). Each of the upper and lower X-shaped spanners 18, 20 are comprised of a pair of spanner members 26 which generally bisect each other medially. In a preferred embodiment, the spanner members 26 comprising the upper and lower X-shaped spanners 18, 20 generally intersect each other at about right angles. In a presently preferred embodiment, a medial X-shaped spanner 28 is attached to the vertical uprights 14 to lend further strength and stability to the display stand module 10.

Figure 6:
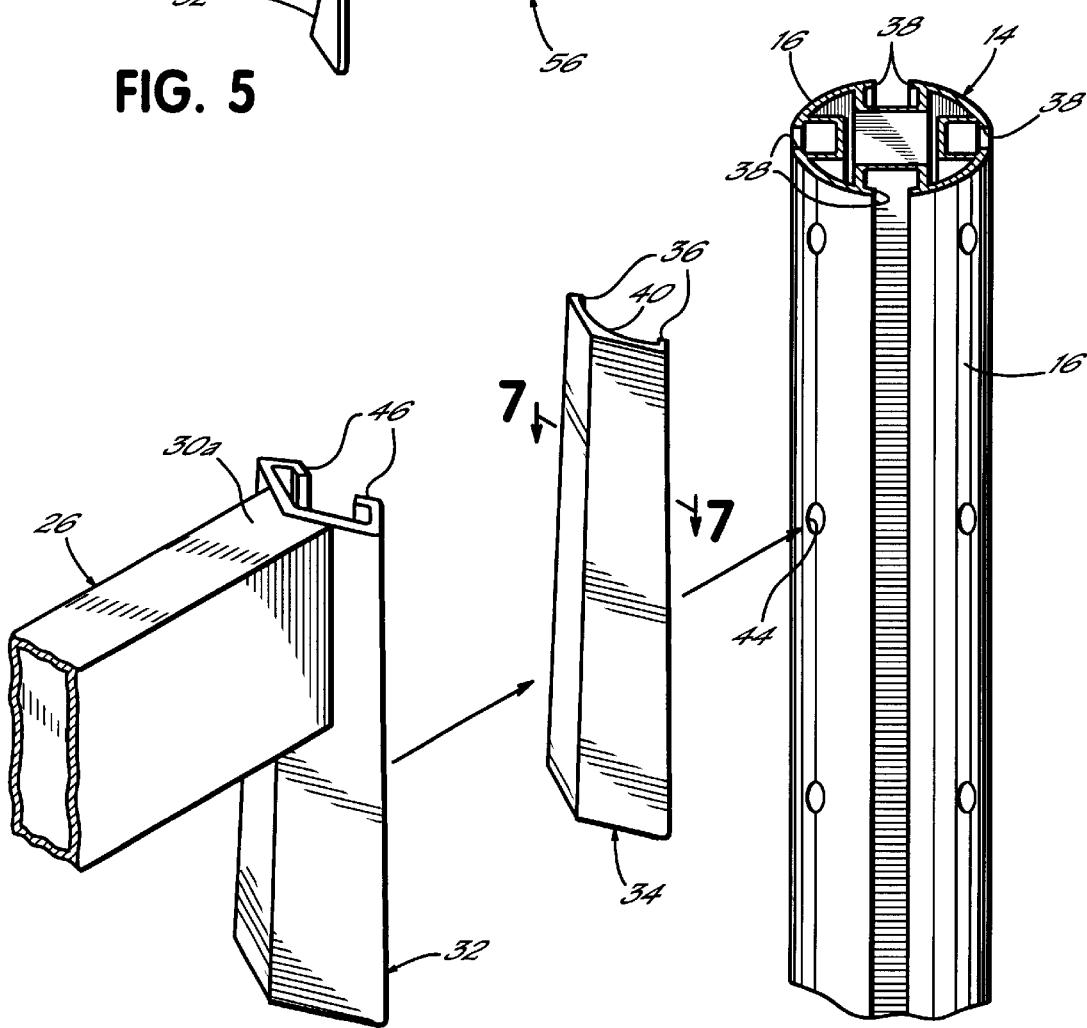
FIG. 6 is an enlarged exploded perspective view of an end portion of an X-shaped spanner and a wedge member being attached to a vertical upright.
Figure 9:
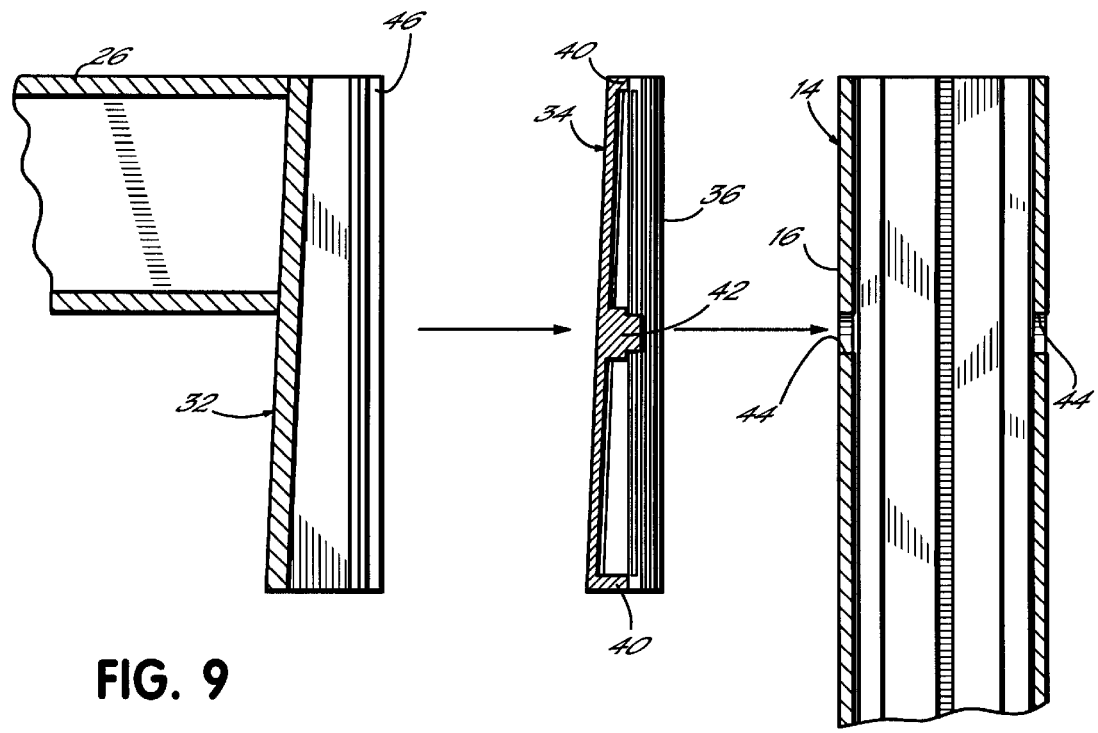
FIG. 9 is a side view of FIG. 6.

Each of the spanner members 26 has a pair of opposed ends 30a, 30b. Each of the opposed ends 30a, 30b has a bracket 32 attached thereto, as best seen in FIGS. 6 and 9. In a presently preferred embodiment, the brackets 32 are made of aluminum and are welded to the spanner members 26. However, any suitable method of attachment may be used. Also, the brackets 32 may be made of any other suitable material.

When assembling the display stand module 10, a wedge member 34 is sandwiched between the bracket 32 and the clover 16. The wedge member 34 has a pair of wedge flanges 36 (FIG. 7) adapted to grip the clover 16 at clover flanges 38 and a pair of end flanges 40 received against the clover 16 to stabilize the wedge member 34 thereagainst. The wedge member 34 has a male projection 42 which mates with a female aperture 44 defined in the clover 16 to secure the wedge member 34 at a desired location.

Figure 7:
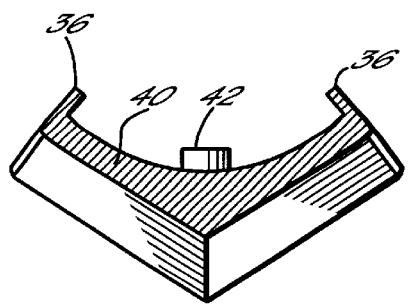
FIG. 7 is a cross-sectional view taken along the line 7—7 of FIG. 6.
Figure 10:
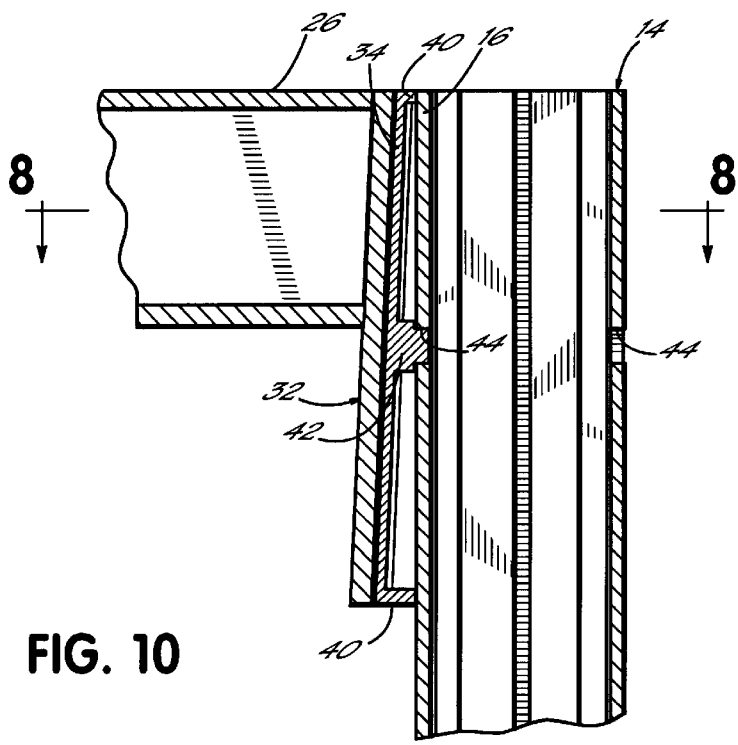
FIG. 10 is a side assembled view of FIG. 8.

The bracket 32 attached to the end of the spanner member 26 is slidably received over the wedge member 34 and the clover 16. The wedge member 34 is configured so that it has a tapering external cross-section along its vertical extent, as seen in FIGS. 6 and 7. The bracket 32 has a similarly tapering interior cross-section throughout its vertical extent which, when slidably received over the wedge member 34 frictionally secures the bracket 32 upon the wedge member 34, as best seen in FIGS. 8–10. The wedge member 34 sandwiched between the bracket 32 and the vertical upright 14 prevents the X-shaped spanners 18, 20 from moving relative to the vertical upright 14. The bracket 32 has bracket flanges 46 that embrace the wedge flanges 36 and frictionally engage the clover flanges 38 to help secure together the bracket 32, wedge member 34 and vertical upright 14.

Figure 3:
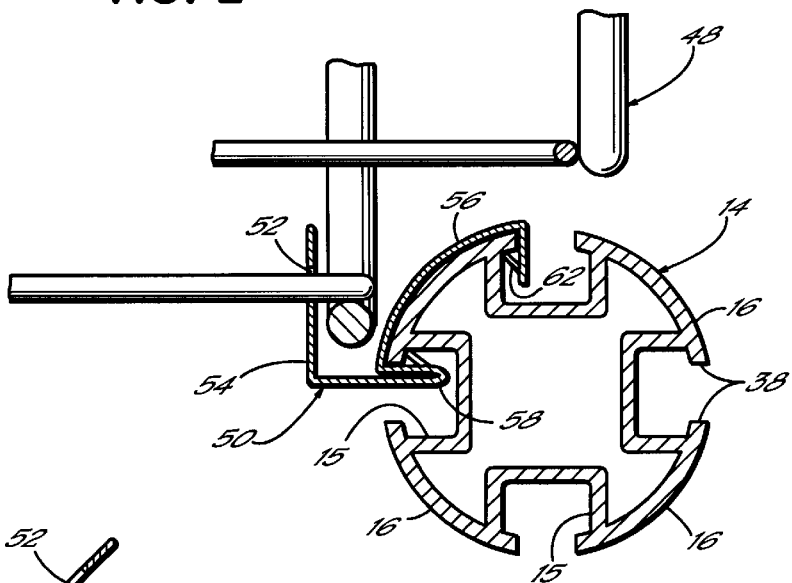
FIG. 3 is a cross-sectional view taken along the line 3—3 of FIG. 2.
Figure 4:
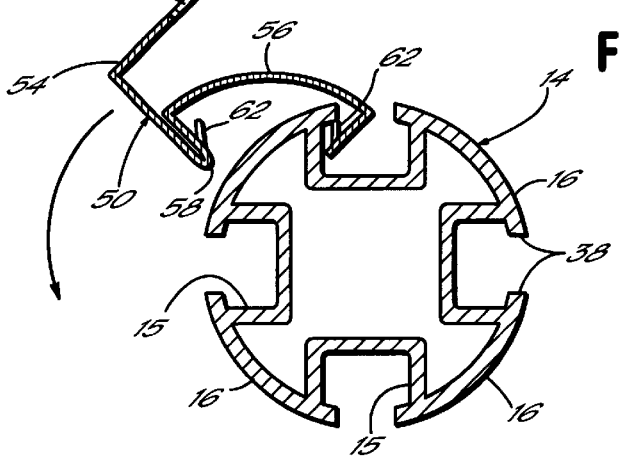
FIG. 4 is a similar view to FIG. 3.
Figure 5:
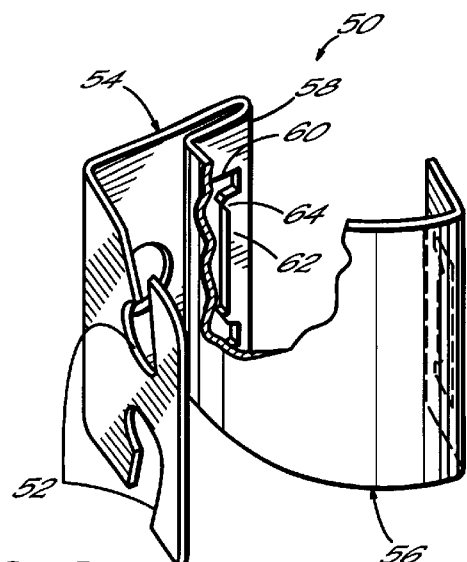
FIG. 5 is a partial cut-away view of a spring clip of the present invention.

After the brackets 32 of the upper and lower X-shaped spanner 18, 20 have been assembled to respective uprights 14 in the presently preferred embodiment, a shelf 48 may be secured thereto with spring clips 50. As best seen in FIGS. 3–5, the spring clip 50 is securely located around a single clover 16 on each of the uprights 14 of the display stand module 10. The clovers 16 used are those to which the upper and lower X-shaped spanners 18, 20 are attached. The spring clips 50 are located at substantially the same height upon respective vertical uprights 14. The shelf 48 is then clipped into a clip recess 52 defined in each respective spring clip 50.

In the presently preferred embodiment, the shelf 48 is made of a wire grid. Also in the preferred embodiment, the spring clips 50 are preferably made of eighteen or twenty gauge steel, and the wedge member 34 is preferably made of polyurethane or polypropylene.

As best seen in FIG. 5, the spring clip 50 has a shelf portion 54 and a clover portion 56. The shelf portion 54 and the clover portion 56 are integrally connected with a clip bend 58. Each clip 50 has a pair of clip recesses 52, which are mirror images of each other so that plural shelves 48 may be attached to a common vertical upright 14.

The spring clip 50 defines a pair of tab apertures 60 in which a pair of tabs 62 are integrally attached to the clover portion 56. As seen in FIGS. 3 and 4, the tabs 62 are bent inwardly so as to enable the clip 50 to be fixedly located at a desired height upon the vertical upright 14. Each tab 62 has a pair of integral barbs 64 which frictionally grip the clover flanges 38 to prevent the clips 50 from sliding down the clover 16 once assembled therewith. Also, the clover portion 56 frictionally engages the clover 16 when a shelf 48 with a load placed thereon is engaged with the clip 50.

In use, after a first display stand module 10 is assembled, additional upper and lower X-shaped spanners 18, 20 may be secured to vertical uprights 14 common with the already assembled display stand module 10 to assemble the second display stand module 10a. To the upper and lower X-shaped spanners 18, 20 attached to the assembled display stand module 10 additional uprights 14 are secured according to the method described above. In a preferred embodiment, the resultant display stand assembly 12 is comprised of a pair of upper X-shaped spanners 18 and a pair of lower X-shaped spanners 20, the pairs of upper and lower X-shaped spanners 18, 20 being attached to a pair of common uprights 14.

Although a detailed description of several preferred embodiments of the present invention have been described above, it will be readily appreciated by those of ordinary skill in the art that many modifications may be made to the present invention without departing from the spirit and scope of the present invention. It is therefore the applicant's intention to be bound only by the scope of the following claims and not to the detailed specifics provided in the specification above.

Therefore, we claim:

1. A display stand module adapted to be joined to other display stand modules to make a display stand assembly, said display stand module comprising:
   - a plurality of vertical uprights, each of said vertical uprights having a cross sectional configuration comprising a plurality of clovers,
   - an upper X-shaped spanner connected to each of said vertical uprights,
   - a lower X-shaped spanner connected to each of said vertical uprights, said upper and lower X-shaped spanners being substantially parallel and vertically spaced from one another and functioning to hold said module together; and
   - at least one wire shelf joined to said vertical uprights with spring clips, said at least one shelf being substantially parallel to said X-shaped spanners.

2. The display stand module of claim 1 wherein each X-shaped spanner comprises a pair of spanner members, each spanner member having a pair of opposed ends with a bracket on each of said opposed ends, said bracket to facilitate attachment of said spanner member to said upright.

3. The display stand module of claim 2 wherein a wedge member is sandwiched between said bracket and said vertical upright in order to help prevent said X-shaped spanner from moving relative to said vertical uprights.

4. The display stand module of claim 3 wherein said wedge member has a projection which is received in an aperture defined in said vertical upright.

5. The display stand module of claim 1 wherein said wedge member is secured to one of said clovers.

6. A display stand module adapted to be joined to other display stand modules to make a display stand assembly, said display stand module comprising:
   - a plurality of vertical uprights, each of said vertical uprights having a cross sectional configuration comprising a plurality of clovers,
   - vertically spaced upper and lower X-shaped spanners connected to each of said vertical uprights to hold said module together, each of said X-shaped spanners comprising a pair of spanner members, each spanner member having a pair of opposed ends with a bracket on each of said opposed ends,
   - wedges sandwiched between said brackets of said X-shaped spanners and said clovers of said vertical uprights to prevent said X-shaped spanners from moving relative to said vertical uprights; and
   - at least one shelf joined to said vertical uprights, said at least one shelf being substantially parallel to said X-shaped spanners.

7. The display stand module of claim 6 wherein each of said wedges has a pair of flanges adapted to grip one of said clovers of said vertical uprights.

8. The display stand module of claim 6 wherein each of said wedges has a male projection adapted to engage a female aperture in one of said clovers of said vertical uprights.

* * * * *